US012222333B2

(12) United States Patent
Nakajima (10) Patent No.: US 12,222,333 B2
(45) Date of Patent: Feb. 11, 2025

(54) PREPARATIVE CHROMATOGRAPH AND PREPARATIVE METHOD USING PREPARATIVE CHROMATOGRAPH

(71) Applicant: SHIMADZU CORPORATION, Kyoto (JP)

(72) Inventor: Kosuke Nakajima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 379 days.

(21) Appl. No.: 17/725,892

(22) Filed: Apr. 21, 2022

(65) Prior Publication Data

US 2022/0341895 A1    Oct. 27, 2022

(30) Foreign Application Priority Data

Apr. 26, 2021    (JP) .................. 2021-074305

(51) Int. Cl.
  *G01N 30/14*    (2006.01)
  *G01N 30/02*    (2006.01)
  *G01N 30/32*    (2006.01)
  *G01N 30/38*    (2006.01)

(52) U.S. Cl.
  CPC ............ *G01N 30/14* (2013.01); *G01N 30/32* (2013.01); *G01N 30/38* (2013.01); *G01N 2030/027* (2013.01); *G01N 2030/326* (2013.01)

(58) Field of Classification Search
  CPC ............ B01D 15/40; G01N 2030/027; G01N 2030/326; G01N 30/14; G01N 30/32; G01N 30/38; G01N 30/82
  See application file for complete search history.

(56) References Cited

U.S. PATENT DOCUMENTS

| | | | |
|---|---|---|---|
| 6,685,828 B2 * | 2/2004 | Berger | B01D 15/40 210/659 |
| 2018/0136174 A1 | 5/2018 | Nakamura et al. | |
| 2018/0313795 A1 | 11/2018 | Fujito et al. | |
| 2019/0184319 A1 * | 6/2019 | Tanaka | B01D 45/00 |
| 2019/0302065 A1 * | 10/2019 | Yamazaki | G01N 30/06 |

FOREIGN PATENT DOCUMENTS

| | | |
|---|---|---|
| CN | 107163618 A | 9/2017 |
| JP | 2018-189449 A | 11/2018 |
| WO | 2016/194108 A1 | 12/2016 |

OTHER PUBLICATIONS

Communication issued Dec. 2, 2024 in German patent application No. 10 2022 001 352.5.

* cited by examiner

*Primary Examiner* — Kristina M Deherrera
*Assistant Examiner* — Gedeon M Kidanu
(74) *Attorney, Agent, or Firm* — Sughrue Mion, PLLC (57) ABSTRACT

A preparative chromatograph includes a separation column, and a detector provided downstream of the separation column. Furthermore, the preparative chromatograph includes a fractionator including a gas-liquid separator configured to separate a fluid containing components of a sample into a gas and a liquid, the fractionator being provided downstream of the detector. The preparative chromatograph is configured to supply carbon dioxide to a flow path between the separation column and the fractionator.

9 Claims, 5 Drawing Sheets

PREPARATIVE CHROMATOGRAPH AND PREPARATIVE METHOD USING PREPARATIVE CHROMATOGRAPH

CROSS-REFERENCE TO RELATED APPLICATIONS

This application claims the benefit of priority to Japanese Patent Application No. 2021-074305 filed on Apr. 26, 2021. The entire contents of this application are hereby incorporated herein by reference.

BACKGROUND OF THE INVENTION

Field of the Invention

The present invention relates to a preparative chromatograph and a preparative method using a preparative chromatograph.

Description of the Background Art

Conventionally, a preparative chromatograph is known. Such a preparative chromatograph is disclosed in International Publication No. 2016/194108, for example.

International Publication No. 2016/194108 discloses a preparative chromatograph including a liquid chromatograph unit including a column (separation column) to separate components of a sample, a detector, and a flow path switching unit to perform fractionation. The preparative chromatograph separates the components in the sample using a liquid for a mobile phase. This preparative chromatograph switches a flow path based on the time (delay time) required for a target component in the sample temporally separated by the separation column to reach the flow path switching unit from the detector to preparatively isolate (collect) the target component in the sample.

However, in the preparative chromatograph described in International Publication No. 2016/194108, the target component in the sample is preparatively isolated (collected) by switching the flow path based on the delay time, and thus when the mobile phase of the sample is switched to a mobile phase having a different delay time, it is necessary to set the timing of switching the flow path according to the mobile phase. Therefore, it is desired to allow adjustment of the delay time.

The present invention is intended to solve the above problem. The present invention aims to provide a preparative chromatograph capable of adjusting the delay time and a preparative method using the preparative chromatograph.

SUMMARY OF THE INVENTION

A preparative chromatograph according to a first aspect of the present invention includes a separation column configured to separate components of a sample, a detector provided downstream of the separation column, the detector being configured to detect the components of the sample separated by the separation column, and a fractionator including a gas-liquid separator configured to separate a fluid containing the components of the sample into a gas and a liquid, the fractionator being provided downstream of the detector, the fractionator being configured to fractionate the components of the sample separated by the separation column based on a detection result of the detector, and the preparative chromatograph is configured to supply carbon dioxide to a flow path between the separation column and the fractionator.

A preparative method using a preparative chromatograph according to a second aspect of the present invention includes separating components of a sample by a separation column, detecting the components of the sample separated by the separation column, fractionating the components of the sample separated by the separation column based on a detection result obtained by the detecting, separating a fluid containing the components of the sample fractionated in the fractionating into a gas and a liquid, and supplying carbon dioxide to the fluid containing the components of the sample before the fractionating of the components of the sample separated by the separation column.

In the preparative chromatograph according to the first aspect of the present invention, the carbon dioxide can be supplied to the flow path between the separation column and the fractionator. Accordingly, carbon dioxide is supplied to the flow path between the separation column and the fractionator such that the flow velocity of the components in the sample separated by the separation column is increased in the flow path between the separation column and the fractionator. Consequently, even when a mobile phase having a relatively long delay time is used as a mobile phase of the sample, the time (delay time) required for the components in the sample separated by the separation column to reach the fractionator from the detector can be decreased. Thus, even when the mobile phase having a relatively long delay time is used as the mobile phase of the sample, the delay time can be adjusted to the delay time of a mobile phase having a relatively short delay time due to the carbon dioxide supplied to the flow path between the separation column and the fractionator. Consequently, it is possible to provide the preparative chromatograph capable of adjusting the delay time.

In the preparative method using a preparative chromatograph according to the second aspect of the present invention, before the components of the sample separated by the separation column are fractionated, the carbon dioxide is supplied to the fluid containing the components of the sample. Accordingly, the carbon dioxide is supplied to the fluid containing the components of the sample before the fractionation such that the flow velocity of the components in the sample separated by the separation column in the flow path is increased. Consequently, even when a mobile phase having a relatively long delay time is used as a mobile phase of the sample, the delay time can be decreased. Thus, even when the mobile phase having a relatively long delay time is used as the mobile phase of the sample, the delay time can be adjusted to the delay time of a mobile phase having a relatively short delay time due to the supplied carbon dioxide. Consequently, it is possible to provide the preparative method using a preparative chromatograph capable of adjusting the delay time.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is hereinafter described with reference to the drawings.

A preparative chromatograph 100 according to this embodiment is a preparative device that preparatively isolates (collects) a target component in a sample. The preparative chromatograph 100 according to this embodiment is configured to switch a mode for preparative isolation (preparative mode) between a liquid chromatograph mode in which the sample is sent together with a liquid to separations column 11 (see FIG. 1) and a supercritical fluid chromatograph mode in which the sample is sent together with carbon dioxide in a supercritical state to the separation columns 11. That is, the preparative chromatograph 100 is a preparative device (preparative system) that can switchingly perform preparative isolation by liquid chromatography (LC) and preparative isolation by supercritical fluid chromatography (SFC). Although it is called a supercritical fluid chromatograph mode for convenience, the supercritical fluid chromatograph mode refers to a mode including a case in which components in the sample are separated in a subcritical state in which a mobile phase containing carbon dioxide has not reached a supercritical state or a liquid state in the separation columns 11. Furthermore, the liquid chromatograph mode is a preparative mode using high performance liquid chromatography (HPLC) of the liquid chromatography (LC), in which a mobile phase is pressurized by pumps (62 and 63) and poured into the separation columns 11.

Figure 1:
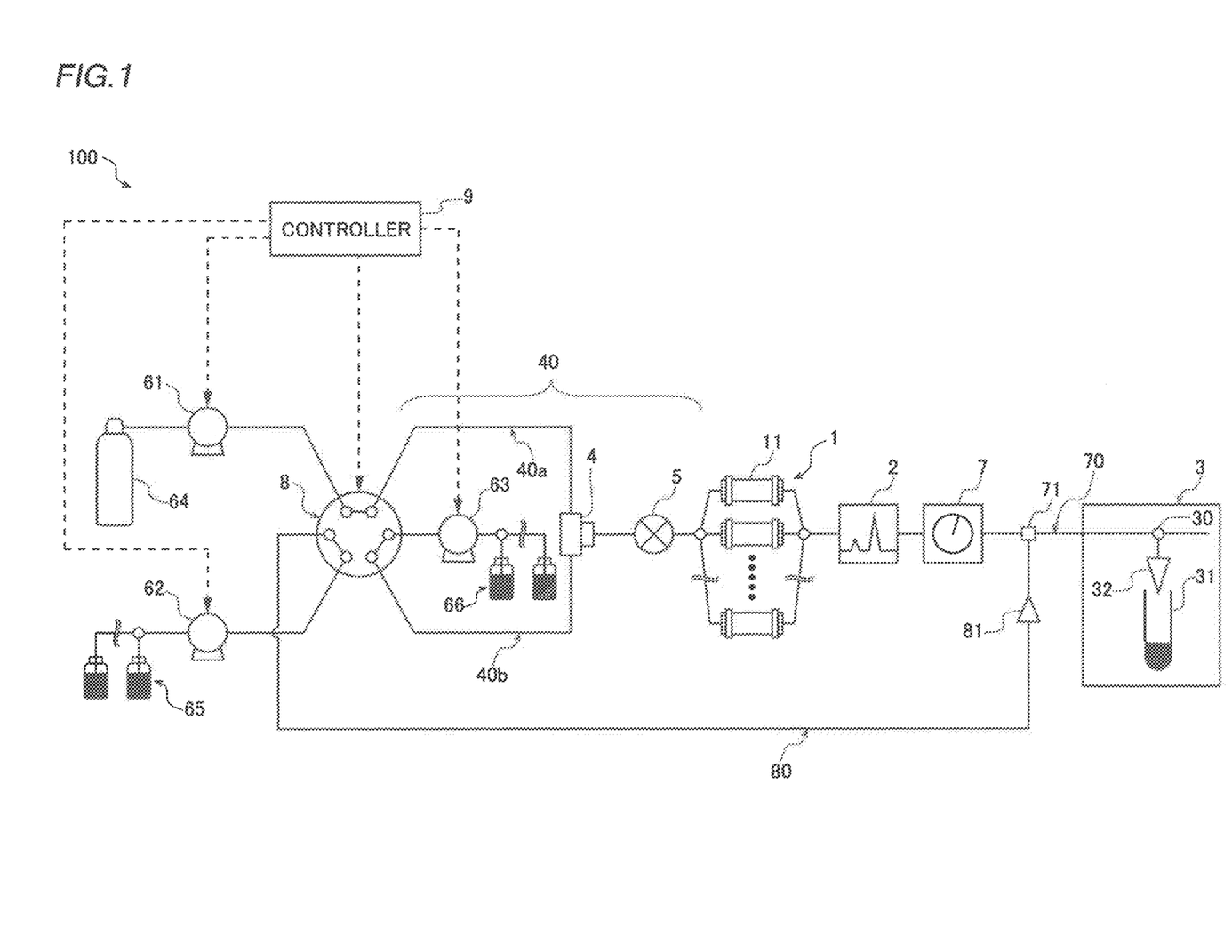
FIG. 1 is a schematic view showing a supercritical fluid chromatograph mode of a preparative chromatograph according to an embodiment of the present invention.

As shown in FIG. 1, the preparative chromatograph 100 includes a separator 1 to separate components of the sample, a detector 2, and a fractionator 3.

As shown in FIG. 1, the preparative chromatograph 100 includes a mixer 4 (mixing unit) to mix a plurality of fluids upstream of the separator 1. Furthermore, a sample injector 5 is provided between the mixer 4 and the separator 1. The sample injected by the sample injector 5 flows to the separator 1 with the fluids mixed by the mixer 4 as a mobile phase. The sample injector 5 is a sample injection device such as an autosampler.

As shown in FIG. 1, the separator 1 includes a plurality of separation columns 11 to separate the components of the sample. The separator 1 is configured to switch the separation columns 11 used to separate the components of the sample according to switching of the sample or the preparative mode described below. The separator 1 temporally separates the components contained in the sample injected by the sample injector 5 in the separation columns 11.

As shown in FIG. 1, the detector 2 is provided downstream of the separation columns 11 and detects the components of the sample separated by the separation columns 11. The detector 2 detects the components in the sample temporarily separated in the separation columns 11 (separator 1). The detector 2 is a visible ultraviolet spectrometer or an absorptiometer, for example.

As shown in FIG. 1, the fractionator 3 is provided downstream of the detector 2 and fractionates the components of the sample separated by the separation columns 11 based on the detection results of the detector 2.

Specifically, the fractionator 3 uses a flow path switch 30 (see FIG. 1) to switch an outflow destination of the fluids flowing from the upstream between a flow path on the preparative container 31 side and a flow path on the waste liquid side (waste liquid flow path). The flow path switch 30 includes a solenoid valve, for example. The fractionator 3 switches the fluid outflow destination based on the time (delay time) required for the target component in the sample to reach the flow path switch 30 in the fractionator 3 from the detector 2 to send the target component in the sample separated by the separation columns 11 to the preparative container 31 and preparatively isolate (collect) the target component in the sample. The fractionator 3 is an automatic fractionator such as a fraction collector, for example.

The fractionator 3 includes a gas-liquid separator 32 (see FIG. 1) to separate a fluid containing the components of the sample into a gas and a liquid. The gas-liquid separator 32 is a tool provided in the flow path on the preparative container 31 side to separate a fluid that has flowed thereinto into a gas and a liquid. For example, the gas-liquid separator 32 is a metal tool that uses a flow path that branches into a plurality of flow paths provided therein such as a LotusStream (registered trademark) separator to separate a gas from a liquid.

As shown in FIG. 1, the preparative chromatograph 100 includes a pump 61, a pump 62, a pump 63, a back pressure regulator 7, and a flow path switching valve 8. The pump 61, the pump 62, and the pump 63 are examples of a "first pump", a "second pump", and a "third pump" in the claims, respectively.

The pump 61 is a pressurizing pump that supplies carbon dioxide to a flow path (40 or 80). The pump 61 pressurizes and sends carbon dioxide filled in a cylinder 64 to an internal flow path of the flow path switching valve 8. The pump 61 supplies carbon dioxide used as a first mobile phase (main solvent) or a make-up solvent to the flow path (40 or 80) via the flow path switching valve 8.

The pump 62 supplies a liquid to the flow path (40 or 80). The pump 62 pressurizes and supplies (sends) the liquid (solvent) from liquid storages 65 that store a plurality of liquids (solvents) used as a second mobile phase or a make-up solvent to the internal flow path of the flow path switching valve 8. The preparative chromatograph 100 is configured to switch the liquid (solvent) supplied from the pump 62 to the flow path (40 or 80) according to switching of the sample or the preparative mode described below. The make-up solvent sent by the pump 62 is sent to prevent clogging due to sample deposition in the flow path. As the make-up solvent, a solvent (solution) containing an organic solvent such as methanol or water and an ionization promoter such as formic acid or ammonia is used, for example. The liquid (solvent) corresponding to the second mobile phase sent by the pump 62 includes water, acetonitrile, or the like, for example.

The pump 63 supplies a liquid to the flow path (40) upstream of the separation columns 11. The pump 63 pressurizes and supplies (sends) the liquid (solvent) from liquid storages 66 that store a plurality of liquids (solvents) used as a third mobile phase or a modifier solvent to the internal flow path of the flow path switching valve 8. The preparative chromatograph 100 is configured to switch the liquid (solvent) supplied from the pump 63 to the flow path (40) upstream of the separation columns 11 according to switching of the sample or the preparative mode described below. A polar organic solvent is used as the modifier solvent sent by the pump 63. Examples of the modifier solvent include methanol, ethanol, isopropanol, and acetonitrile. The liquid (solvent) corresponding to the third mobile phase sent by the pump 63 includes water, acetonitrile, or the like, for example.

As shown in FIG. 1, the back pressure regulator 7 is provided between the detector 2 provided downstream of the separation columns 11 and the gas-liquid separator 32. The back pressure regulator 7 adjusts a pressure in the flow path on the detector 2 side. The back pressure regulator 7 adjusts a pressure in the flow path upstream of the back pressure regulator 7 such that the carbon dioxide flowing upstream of the back pressure regulator 7 can maintain a supercritical fluid state in the flow path.

A pressure in the flow path downstream of the back pressure regulator 7 is lower than that in the flow path upstream of the back pressure regulator 7. For example, the pressure in the flow path downstream of the back pressure regulator 7 is atmospheric pressure. Therefore, carbon dioxide cannot maintain a supercritical fluid state in the flow path downstream of the back pressure regulator 7 and expands.

The internal flow path of the flow path switching valve 8 is connected to an internal flow path of each of the pumps 61 to 63. The internal flow path of the flow path switching valve 8 is connected to the mixer 4 via a flow path 40*a* and a flow path 40*b*, which are the flow path (40) upstream of the separation columns 11.

In the preparative chromatograph 100, the mixer 4, the sample injector 5, the separator 1 (separation columns 11), the detector 2, the back pressure regulator 7, and the fractionator 3 (gas-liquid separator 32) are provided in this order downstream of the flow path switching valve 8.

The internal flow path of the flow path switching valve 8 is connected to the flow path 80 connected to a three-way tee (three-way joint) 71 provided in a flow path (70) between the back pressure regulator 7 and the fractionator 3. Furthermore, a check valve 81 is provided in the flow path 80 to prevent backflow of a fluid from the three-way tee 71 (flow path 70) side.

The flow path switching valve 8 switches a supply destination of the carbon dioxide supplied from the pump 61 between the flow path (70) between the back pressure regulator 7 and the fractionator 3 and the flow path (40) upstream of the separation columns 11.

Figure 2:
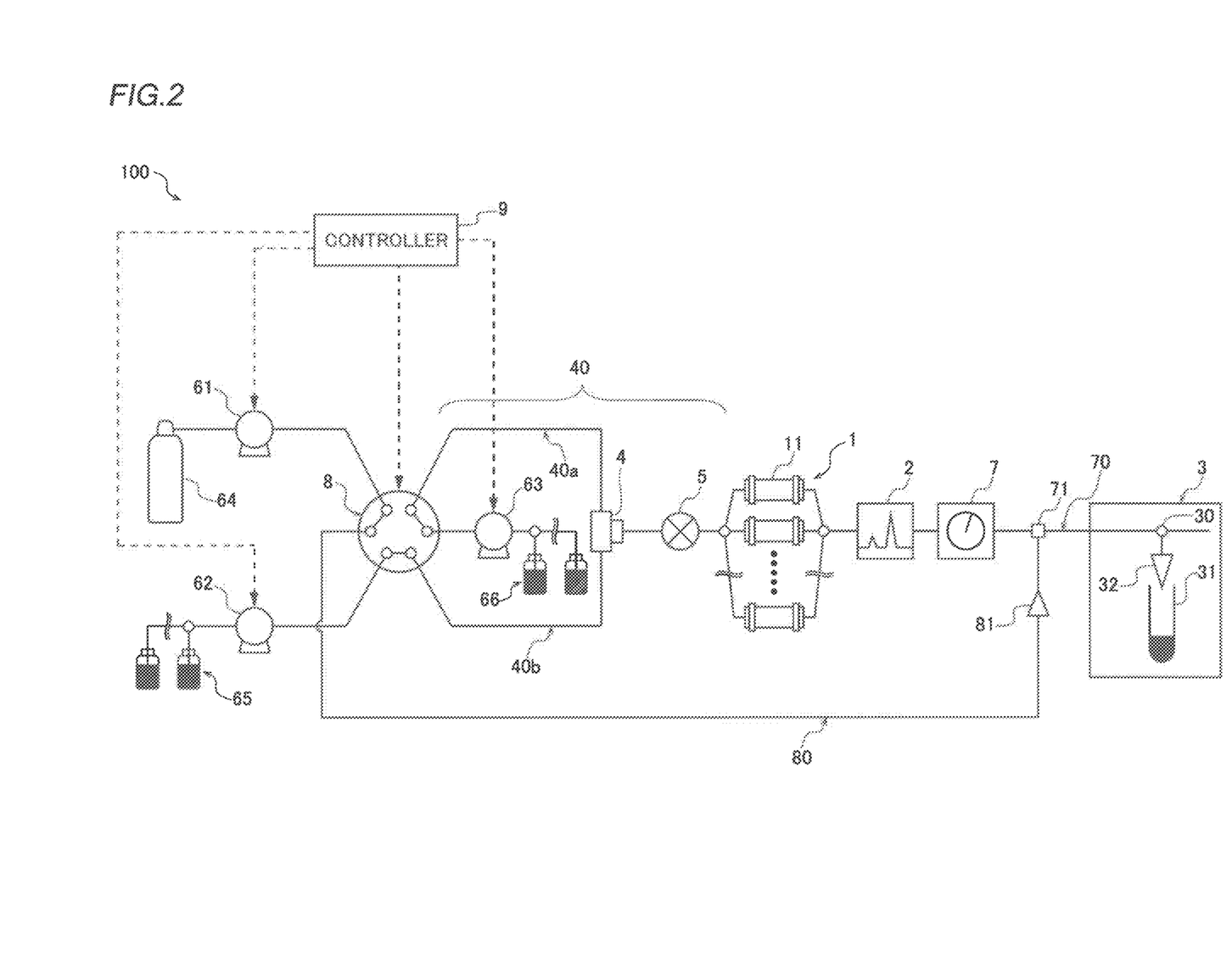
FIG. 2 is a schematic view showing a liquid chromatograph mode of the preparative chromatograph according to the embodiment of the present invention.

Specifically, the flow path switching valve 8 switches its internal flow path to switch between a state in which the carbon dioxide in a supercritical state supplied by the pump 61 (carbon dioxide pressurized to a supercritical state by the pump 61) is supplied to the mixer 4 via the flow path 40*a* (see FIG. 1) and a state in which the carbon dioxide supplied by the pump 61 is supplied to the flow path (70) between the back pressure regulator 7 and the fractionator 3 via the flow path 80 (see FIG. 2).

That is, the preparative chromatograph 100 is configured to supply carbon dioxide to the flow path (70) between the separation columns 11 and the fractionator 3. In this embodiment, as described below, the preparative chromatograph 100 is configured to supply carbon dioxide to the flow path (70) between the separation columns 11 and the fractionator 3 in the liquid chromatograph mode.

The flow path switching valve 8 switches a supply destination of the liquid supplied from the pump 62 between the flow path (40) upstream of the separation columns 11 and the flow path (70) between the back pressure regulator 7 and the fractionator 3.

Specifically, the flow path switching valve 8 switches its internal flow path to switch between a state in which the liquid (solvent) supplied by the pump 62 is supplied to the flow path (70) between the back pressure regulator 7 and the fractionator 3 via the flow path 80 (see FIG. 1) and a state in which the liquid (solvent) supplied from the pump 62 is supplied to the mixer 4 via the flow path 40*b* (see FIG. 2).

The flow path switching valve 8 switches between a state in which the liquid supplied from the pump 63 is supplied to the mixer 4 via the flow path 40*b* (see FIG. 1) and a state in which the liquid supplied from the pump 62 is supplied to the mixer 4 via the flow path 40*a* (see FIG. 2) with the switching of the internal flow path as described above.

The preparative chromatograph 100 includes a controller 9 to control driving of the pump 61. The controller 9 includes a processor such as a central processing unit (CPU), a memory, etc. The controller 9 controls the entire preparative chromatograph 100 by control software (program) recorded (stored) in an internal or external memory (storage device).

The controller 9 controls switching of the separation columns 11, flow path switching by the flow path switching valve 8, the amount of fluid supplied from the pumps 61 to 63, and switching of the liquids supplied by the pumps 62 and 63 based on preset conditions (recipes). Furthermore, the controller 9 controls fractionation (flow path switching) in the fractionator 3 based on the detection results of the detector 2.

That is, in the preparative chromatograph 100, a control of switching of the preparative mode, a control of flow path switching by the flow path switching valve 8, a control of the flow rates (supply amounts) of the fluids supplied from the pumps 61 to 63, a control of the mixing ratio of a solvent and a mobile phase in the mixer 4, a control of fractionation in the fractionator 3, etc. are collectively managed by software. The fractionation (flow path switching) in the fractionator 3 may be controlled by a device provided separately from the controller 9. Furthermore, the controller 9 receives an operation from a user via an input device (not shown) such as a mouse, a keyboard, or a touch panel.

The controller 9 controls switching of the supply destination of the carbon dioxide supplied from the pump 61 by the flow path switching valve 8 based on the switching operation of the user. Thus, the controller 9 supplies the carbon dioxide in the supercritical state supplied from the pump 61 to the flow path (40) upstream of the separation columns 11 in the supercritical fluid chromatograph mode (see FIG. 1), and supplies the carbon dioxide supplied from the pump 61 to the flow path (70) between the back pressure regulator 7 and the fractionator 3 in the liquid chromatograph mode (see FIG. 2).

That is, as described above, the preparative chromatograph 100 switches the carbon dioxide supply destination between the flow path (40) upstream of the separation columns 11 and the flow path (70) downstream of the separation columns 11 to switch between the liquid chromatograph mode and the supercritical fluid chromatograph mode.

The controller 9 controls switching of the supply destination of the liquid supplied from the pump 62 by the flow path switching valve 8 based on the switching operation of the user. Thus, the controller 9 supplies the liquid supplied from the pump 62 to the flow path (70) between the back pressure regulator 7 and the fractionator 3 in the supercritical fluid chromatograph mode (see FIG. 1), and mixes the liquid supplied from the pump 62 and the liquid supplied from the pump 63 in the flow path (40) upstream of the separation columns 11 in the liquid chromatograph mode (see FIG. 2).

Supercritical Fluid Chromatograph Mode

A preparative method of the preparative chromatograph 100 in the supercritical fluid chromatograph mode is now described with reference to FIG. 1.

In the supercritical fluid chromatograph mode, flow path switching is provided by the flow path switching valve 8 such that the carbon dioxide in the supercritical state corresponding to the first mobile phase is supplied from the pump 61 (cylinder 64) to the mixer 4 upstream of the separation columns 11 (separator 1) via the flow path switching valve 8. Furthermore, flow path switching is provided by the flow path switching valve 8 such that the modifier solvent is supplied from the pump 63 (liquid storages 66) to the mixer 4 upstream of the separation columns 11 (separator 1) via the flow path switching valve 8. Then, the mixer 4 mixes the carbon dioxide in the supercritical state and the modifier solvent. The carbon dioxide used as the first mobile phase is suitable for separating non-polar components (substances). The preparative chromatograph 100 can separate highly polar components (substances) by increasing the supply amount (addition amount) of modifier solvent in the supercritical fluid chromatograph mode.

As described above, in the supercritical fluid chromatograph mode, the pump 61 is used as a mobile phase pump to supply a mobile phase into the flow path 40. In the supercritical fluid chromatograph mode, the pump 63 is used as a modifier pump to supply a modifier solvent into the flow path 40. The supply of the carbon dioxide in the supercritical state by the pump 61 is started at the same time or substantially the same time as the start of the supply of the modifier solvent by the pump 63.

Then, the sample is injected by the sample injector 5 into a fluid obtained by mixing the carbon dioxide (first mobile phase) in the supercritical state and the modifier solvent. The fluid containing the carbon dioxide in the supercritical state into which the sample has been injected flows into the separation columns 11 of the separator 1.

Then, the components of the sample that have flowed into the separation columns 11 together with the fluid containing the carbon dioxide in the supercritical state are separated by the separation columns 11. Then, the components of the sample separated by the separation columns 11 flow into the detector 2, and are detected by the detector 2.

After the detection by the detector 2, the components of the sample separated by the separation columns 11 flow into the fractionator 3 via the back pressure regulator 7 together with the fluid containing the carbon dioxide. In the supercritical fluid chromatograph mode, as described above, the back pressure regulator 7 adjusts the pressure in the flow path upstream of the back pressure regulator 7 such that the carbon dioxide used as the mobile phase can maintain the supercritical fluid state. Therefore, in the downstream of the back pressure regulator 7, the carbon dioxide becomes a gas and expands. Thus, the flow velocity of the components of the sample separated by the separation columns 11 increases due to the expansion of the carbon dioxide, and the delay time (the time required for the target component in the sample to reach the flow path switch 30 in the fractionator 3 from the detector 2). Then, the components of the sample separated by the separation columns 11 are fractionated in the fractionator 3 based on the detection results of the detector 2.

In the fractionator 3, the flow path is switched based on the target component in the sample being detected in the detector 2 such that the target component in the sample flows to a flow path on the gas-liquid separator 32 side. Specifically, immediately before or after the delay time (the time required for the target component in the sample to reach the flow path switch 30 in the fractionator 3 from the detector 2) elapses from the time at which the target component in the sample is detected, the flow path switch 30 switches the flow path in the fractionator 3 such that the target component in the sample flows to the flow path on the gas-liquid separator 32 side. Then, immediately before or after the delay time elapses from the time at which the target component in the sample is no longer detected, the flow path switch 30 switches the flow path in the fractionator 3 such that components other than the target component in the sample flow to the waste liquid flow path. Thus, the fluid containing the fractionated components of the sample flows into the gas-liquid separator 32. Then, the fluid containing the fractionated components of the sample is separated into a gas and a liquid by the gas-liquid separator 32, and the target component in the sample is collected in the preparative container 31.

In the supercritical fluid chromatograph mode, flow path switching is provided by the flow path switching valve 8 such that the make-up solvent is supplied from the pump 62 to the flow path (70) between the back pressure regulator 7 and the fractionator 3 via the flow path switching valve 8 and the flow path 80. That is, before the components of the sample separated by the separation columns 11 are fractionated by the fractionator 3 (before the fluid containing the components of the sample is separated into the gas and the liquid in the gas-liquid separator 32), the make-up solvent is supplied from the pump 62 to the fluid containing the components of the sample. Thus, in the supercritical fluid chromatograph mode, the pump 62 is used as a make-up pump to supply the make-up solvent into the flow path (70).

The timing of the start of the supply of the make-up solvent by the pump 62 (the start of liquid sending) is the same as the start of the supply of the carbon dioxide in the supercritical state by the pump 61 and the start of the supply of the modifier solvent by the pump 63, or after those starts.

Liquid Chromatograph Mode

A preparative method of the preparative chromatograph 100 in the liquid chromatograph mode is now described with reference to FIG. 2. When the supercritical fluid chromatograph mode is switched to the liquid chromatograph mode and when the liquid chromatograph mode is switched to the supercritical fluid chromatograph mode, a cleaning process and a replacement process in the flow path are performed based on a control of the controller 9.

In the liquid chromatograph mode, flow path switching is provided by the flow path switching valve 8 such that the liquid (solvent) corresponding to the second mobile phase is supplied from the pump 62 (liquid storages 65) to the mixer 4 upstream of the separation columns 11 (separator 1) via the flow path switching valve 8. Furthermore, flow path switching is provided by the flow path switching valve 8 such that a liquid (solvent) corresponding to the third mobile phase is supplied from the pump 63 (liquid storages 66) to the mixer 4 upstream of the separation columns 11 (separator 1) via the flow path switching valve 8. Then, the mixer 4 mixes the liquid (solvent) corresponding to the second mobile phase and the liquid (solvent) corresponding to the third mobile phase.

That is, in the liquid chromatograph mode, the pumps 62 and 63 are used as mobile phase pumps to supply liquids (solvents) as mobile phases into the flow path. The supply of the liquid (solvent) corresponding to the second mobile phase by the pump 62 is started at the same time or substantially the same time as the start of the supply of the liquid (solvent) corresponding to the third mobile phase by the pump 63.

Then, the sample is injected by the sample injector 5 into a liquid obtained by mixing the liquid (solvent) corresponding to the second mobile phase and the liquid (solvent) corresponding to the third mobile phase. The liquid (solvent) into which the sample has been injected flows into the separation columns 11 of the separator 1.

Then, the components of the sample that have flowed into the separation columns 11 together with the liquid obtained by mixing the liquid (solvent) corresponding to the second mobile phase and the liquid (solvent) corresponding to the third mobile phase are separated by the separation columns 11. Then, the components of the sample separated by the separation columns 11 flow into the detector 2, and are detected by the detector 2.

After the detection by the detector 2, the components of the sample separated by the separation columns 11 flow into the fractionator 3 via the back pressure regulator 7 together with the liquid obtained by mixing the liquid (solvent) corresponding to the second mobile phase and the liquid (solvent) corresponding to the third mobile phase. At this time, in the liquid chromatograph mode, flow path switching is provided by the flow path switching valve 8 such that carbon dioxide is supplied from the pump 61 to the flow path (70) between the back pressure regulator 7 and the fractionator 3 via the flow path switching valve 8 and the flow path 80. Therefore, in the liquid chromatograph mode of the preparative chromatograph 100 according to this embodiment, the components of the sample separated by the separation columns 11 flow into the fractionator 3 with carbon dioxide added to the liquid obtained by mixing the liquid (solvent) corresponding to the second mobile phase and the liquid (solvent) corresponding to the third mobile phase. Then, as in the supercritical fluid chromatograph mode, the components of the sample separated by the separation columns 11 are fractionated in the fractionator 3 based on the detection results of the detector 2.

That is, in the liquid chromatograph mode of the preparative chromatograph 100 according to this embodiment, carbon dioxide is supplied to the fluid (liquid) containing the components in the sample before the components of the sample separated by the separation columns 11 are fractionated by the fractionator 3 (before the fluid containing the components of the sample is separated into a gas and a liquid in the gas-liquid separator 32), unlike preparative isolation using the conventional liquid chromatography.

Thus, the fluid containing the fractionated components of the sample (the fluid obtained by adding carbon dioxide to the liquid obtained by mixing the liquid corresponding to the second mobile phase and the liquid corresponding to the third mobile phase) is separated into a gas and a liquid by the gas-liquid separator 32, and the target component in the sample is collected in the preparative container 31.

In the liquid chromatograph mode, before the fluid containing the components of the sample is separated into a gas and a liquid in the gas-liquid separator 32 (before the components of the sample separated by the separation columns 11 are fractionated by the fractionator 3), carbon dioxide is supplied into the flow path (70) as a make-up solvent for normally performing gas-liquid separation in the gas-liquid separator 32. Thus, in the liquid chromatograph mode, the pump 61 is used as a make-up pump to supply carbon dioxide corresponding to a make-up solvent into the flow path (70).

In the liquid chromatograph mode, carbon dioxide pressurized by the pump 61 is supplied downstream (in the flow path under atmospheric pressure) of the back pressure regulator 7 in which the back pressure is not adjusted (no back pressure is applied), and thus the supplied carbon dioxide expands in the flow paths (the internal flow path of the flow path switching valve 8 and the flow paths 70 and 80) downstream of the pump 61. Thus, the flow velocity of the components of the sample separated by the separation columns 11 and flowing through the flow path (70) increases, and the delay time (the time required for the target component in the sample to reach the flow path switch 30 in the fractionator 3 from the detector 2) decreases. The preparative chromatograph 100 can adjust (decrease) the delay time at the time of fractionation (preparative isolation) by controlling the amount or flow velocity of carbon dioxide supplied to the flow path (70) between the separation columns 11 and the fractionator 3 in the liquid chromatograph mode.

The timing of the start of the supply of the carbon dioxide corresponding to a make-up solvent by the pump 61 (the start of liquid sending) is the same as the start of the supply of the liquid (solvent) corresponding to the second mobile phase by the pump 62 and the start of the supply of the liquid (solvent) corresponding to the third mobile phase by the pump 63, or after those starts.

Advantages of Preparative Chromatograph According to this Embodiment

In the preparative chromatograph 100 according to this embodiment, the following advantages are obtained.

In the preparative chromatograph 100 according to this embodiment, the carbon dioxide can be supplied to the flow path (70) between the separation columns 11 and the fractionator 3. Accordingly, carbon dioxide is supplied to the flow path (70) between the separation columns 11 and the fractionator 3 such that the flow velocity of the components in the sample separated by the separation columns 11 is increased in the flow path (70) between the separation columns 11 and the fractionator 3. Consequently, even when a mobile phase (liquid) having a relatively long delay time is used as the mobile phase of the sample, the time (delay time) required for the components in the sample separated by the separation columns 11 to reach the fractionator 3 from the detector 2 can be decreased. Thus, even when the mobile phase (liquid) having a relatively long delay time is used as the mobile phase of the sample, the delay time can be adjusted to the delay time of a mobile phase (supercritical fluid) having a relatively short delay time due to the carbon dioxide supplied to the flow path (70) between the separation columns 11 and the fractionator 3. Consequently, the delay time can be adjusted.

The preparative chromatograph 100 according to the aforementioned embodiment is configured as follows such that the following advantages are further obtained.

The preparative chromatograph 100 according to this embodiment is configured to switch between the liquid chromatograph mode and the supercritical fluid chromatograph mode and to supply carbon dioxide to the flow path (70) between the separation columns 11 and the fractionator 3 in the liquid chromatograph mode. Accordingly, the preparative mode is switched between the liquid chromatograph mode and the supercritical fluid chromatograph mode such that preparative isolation can be performed according to the sample, and thus preparative isolation of the sample can be efficiently performed. Furthermore, in the liquid chromatograph mode, carbon dioxide is supplied to the flow path (70) between the separation columns 11 and the fractionator 3 such that the flow velocity of the components in the sample separated by the separation columns 11 is increased in the flow path (70) between the separation columns 11 and the fractionator 3. Thus, in the liquid chromatograph mode, the time (delay time) required for the components in the sample separated by the separation columns 11 to reach the fractionator 3 from the detector 2 can be decreased. Consequently, due to the carbon dioxide supplied to the flow path (70) between the separation columns 11 and the fractionator 3, the delay time in the liquid chromatograph mode can be adjusted to the delay time in the supercritical fluid chromatograph mode (a mode having a short delay time). Furthermore, carbon dioxide is supplied to the flow path (70) between the separation columns 11 and the fractionator 3 such that even when only a liquid is used as the mobile phase of the sample up to the separation columns 11, carbon dioxide can be added to the mobile phase prior to separation by the gas-liquid separator 32. Thus, in the liquid chromatograph mode, even when only a liquid is used as the mobile phase of the sample up to the separation columns 11, gas-liquid separation can be normally performed in the gas-liquid separator 32 due to the gaseous carbon dioxide even with the gas-liquid separator 32 provided in the fractionator 3. Consequently, unlike a case in which the target component in the sample is sent to the gas-liquid separator 32 in the fractionator 3 by a mobile phase including only a liquid, it is not necessary to attach or detach the gas-liquid separator 32 at the time of switching between the supercritical fluid chromatograph mode and the liquid chromatograph mode. Thus, the configuration of the fractionator 3 can be made common, and thus the complexity of the device configuration is significantly reduced or prevented.

The preparative chromatograph 100 according to this embodiment includes the pump 61, the back pressure regulator 7, and the flow path switching valve 8. Furthermore, the flow path switching valve 8 switches the supply destination of the carbon dioxide supplied from the pump 61 between the flow path (70) between the back pressure regulator 7 and the fractionator 3 and the flow path (40) upstream of the separation columns 11. Accordingly, the supply destination of the carbon dioxide supplied from the pump 61 can be switched by the flow path switching valve 8, and thus the carbon dioxide can be supplied to each of the flow path (70) between the back pressure regulator 7 and the fractionator 3 and the flow path (40) upstream of the separation columns 11 by a common (one) pump. Consequently, an increase in the number of pumps used to supply carbon dioxide to the flow path (70) between the back pressure regulator 7 and the fractionator 3 and the flow path (40) upstream of the separation columns 11 can be significantly reduced or prevented, and thus an increase in the size of the device can be significantly reduced or prevented.

In the preparative chromatograph 100 according to this embodiment, the flow path switching valve 8 switches the supply destination of the liquid supplied from the pump 62 between the flow path (40) upstream of the separation columns 11 and the flow path (70) between the back pressure regulator 7 and the fractionator 3. Accordingly, the flow path switching valve 8 can switch the supply destination of the liquid supplied from the pump 62, and thus the liquid can be supplied to each of the flow path (40) upstream of the separation columns 11 and the flow path (70) between the back pressure regulator 7 and the fractionator 3 by a common (one) pump. Consequently, an increase in the number of pumps used to supply the liquid (solution) to the flow path (40) upstream of the separation columns 11 and the flow path (70) between the back pressure regulator 7 and the fractionator 3 can be significantly reduced or prevented, and thus an increase in the size of the device can be significantly reduced or prevented.

In the preparative chromatograph 100 according to this embodiment, the controller 9 controls switching of the supply destination of the carbon dioxide supplied from the pump 61 by the flow path switching valve 8 based on the switching operation of the user. Accordingly, as compared with a case in which the user directly (manually) switches the supply destination of the carbon dioxide supplied from the pump 61 by the flow path switching valve 8, it is easier to switch the supply destination of the carbon dioxide supplied from the pump 61.

In the preparative chromatograph 100 according to this embodiment, the controller 9 controls switching of the supply destination of the carbon dioxide supplied from the pump 61 by the flow path switching valve 8 based on the switching operation of the user to supply the carbon dioxide supplied from the pump 61 is supplied to the flow path (70) between the back pressure regulator 7 and the fractionator 3 in the liquid chromatograph mode. Furthermore, the controller 9 controls switching of the supply destination of the carbon dioxide supplied from the pump 61 by the flow path switching valve 8 based on the switching operation of the user to supply the carbon dioxide in the supercritical state supplied from the pump 61 to the flow path (40) upstream of the separation columns 11 in the supercritical fluid chromatograph mode. Accordingly, the controller 9 controls switching of the supply destination of the carbon dioxide supplied from the pump 61 between the liquid chromatograph mode and the supercritical fluid chromatograph mode. Consequently, as compared with a case in which the user directly (manually) switches the supply destination of the carbon dioxide at the time of switching between the liquid chromatograph mode and the supercritical fluid chromatograph mode (switching the preparative mode), it is easier to switch the supply destination of the carbon dioxide supplied from the pump 61.

In the preparative chromatograph 100 according to this embodiment, the controller 9 controls switching of the supply destination of the liquid supplied from the pump 62 by the flow path switching valve 8 based on the switching operation of the user to mix the liquid supplied from the pump 62 and the liquid supplied from the pump 63 in the flow path (40) upstream of the separation columns 11 in the liquid chromatograph mode. Furthermore, the controller 9 controls switching of the supply destination of the liquid supplied from the pump 62 by the flow path switching valve 8 based on the switching operation of the user to supply the liquid supplied from the pump 62 to the flow path (70) between the back pressure regulator 7 and the fractionator 3 in the supercritical fluid chromatograph mode. Accordingly, the controller 9 controls switching of the supply destination of the liquid supplied from the pump 62 between the liquid chromatograph mode and the supercritical fluid chromatograph mode. Consequently, as compared with a case in which the user directly (manually) switches the supply destination of the liquid (solvent) supplied from the pump 62 at the time of switching between the liquid chromatograph mode and the supercritical fluid chromatograph mode (switching the preparative mode), it is easier to switch the supply destination of the liquid (solvent) supplied from the pump 62.

Advantages of Preparative Method using Preparative Chromatograph According to this Embodiment In the preparative method using the preparative chromatograph 100 according to this embodiment, the following advantages are obtained.

In the preparative method using the preparative chromatograph 100 according to this embodiment, before the components of the sample separated by the separation columns 11 are fractionated, the carbon dioxide is supplied to the fluid containing the components of the sample. Accordingly, the carbon dioxide is supplied to the fluid containing the components of the sample before the fractionation such that the flow velocity of the components in the sample separated by the separation columns 11 in the flow path is increased. Consequently, even when a mobile phase (liquid) having a relatively long delay time is used as the mobile phase of the sample, the delay time can be decreased. Thus, even when the mobile phase (liquid) having a relatively long delay time is used as the mobile phase of the sample, the delay time can be adjusted to the delay time of a mobile phase (supercritical fluid) having a relatively short delay time due to the supplied carbon dioxide. Consequently, the delay time can be adjusted.

The preparative method using the preparative chromatograph 100 according to the aforementioned embodiment is implemented as follows such that the following advantages are further obtained.

In the preparative method using the preparative chromatograph 100 according to this embodiment, the supply destination of the carbon dioxide is switched between the flow path (40) upstream of the separation columns 11 and the flow path (70) downstream of the separation columns 11 such that the preparative mode of the preparative chromatograph 100 is switched between the liquid chromatograph mode and the supercritical fluid chromatograph mode. Accordingly, the preparative mode is switched between the liquid chromatograph mode and the supercritical fluid chromatograph mode such that preparative isolation can be performed according to the sample, and thus preparative isolation of the sample can be efficiently performed. Furthermore, in the liquid chromatograph mode, the carbon dioxide is supplied to the flow path (70) downstream of the separation columns 11 such that the flow velocity of the components in the sample separated by the separation columns 11 is increased in the flow path (70) downstream of the separation columns 11. Thus, the delay time in the liquid chromatograph mode can be decreased. Consequently, the delay time in the liquid chromatograph mode can be adjusted to the delay time in the supercritical fluid chromatograph mode (a mode having a short delay time) due to the carbon dioxide supplied to the flow path (70) downstream of the separation columns 11. Furthermore, the carbon dioxide is supplied to the flow path (70) downstream of the separation columns 11 such that even when only a liquid is used as the mobile phase of the sample up to the separation columns 11, the carbon dioxide can be added to the mobile phase prior to separation of the fluid containing the components of the sample into a gas and a liquid (gas-liquid separation). Thus, even when only a liquid is used as the mobile phase of the sample up to the separation columns 11 in the liquid chromatograph mode, the carbon dioxide added to the mobile phase in the flow path (70) downstream of the separation columns 11 becomes a gas such that gas-liquid separation can be normally performed. Consequently, unlike a case in which the target component in the sample is sent to a tool such as the gas-liquid separator 32 that performs gas-liquid separation by a mobile phase including only a liquid, it is not necessary to attach or detach a tool such as the gas-liquid separator 32 that performs gas-liquid separation at the time of switching between the supercritical fluid chromatograph mode and the liquid chromatograph mode. Thus, the configuration of the portion (the gas-liquid separator 32 and the fractionator 3) that performs gas-liquid separation in the preparative chromatograph 100 can be made common, and thus the complexity of the device configuration can be significantly reduced or prevented.

MODIFIED EXAMPLES

The embodiment disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

Figure 3:
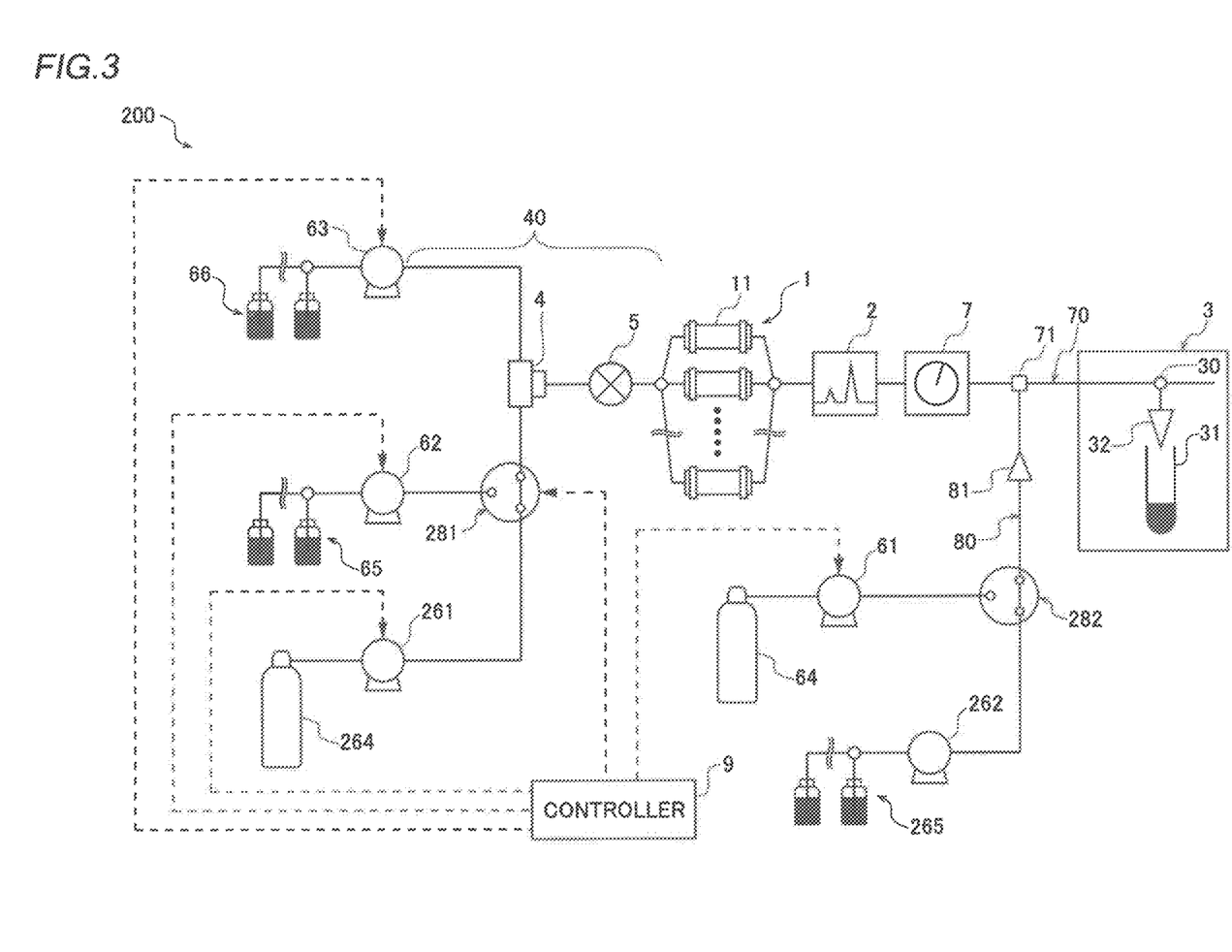
FIG. 3 is a schematic view showing a supercritical fluid chromatograph mode of a preparative chromatograph according to a first modified example.
Figure 4:
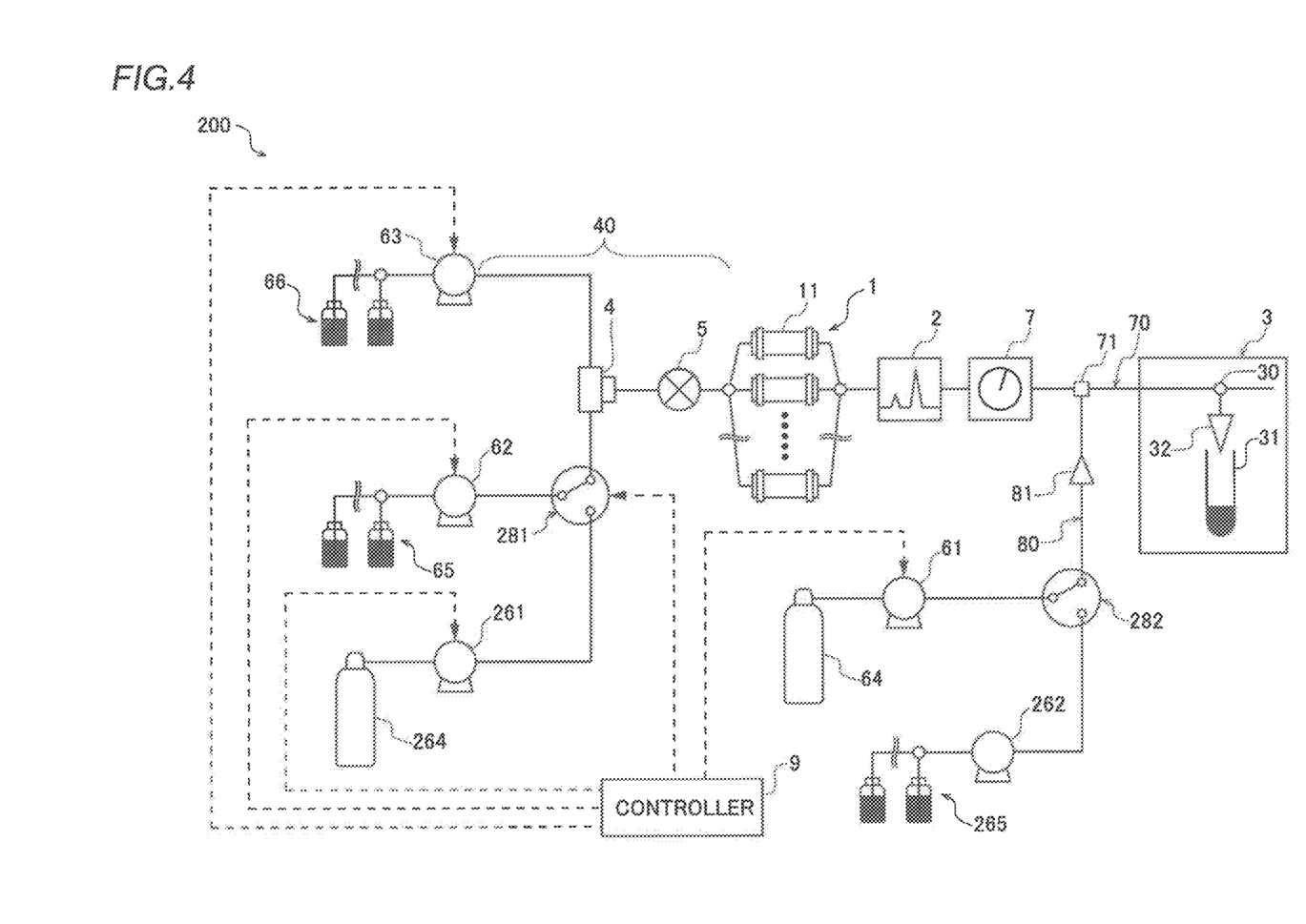
FIG. 4 is a schematic view showing a liquid chromatograph mode of the preparative chromatograph according to the first modified example.

For example, while the flow path switching valve 8 switches the supply destination of the carbon dioxide supplied from the pump 61 (first pump) between the flow path (70) between the back pressure regulator 7 and the fractionator 3 and the flow path (40) upstream of the separation columns 11 in the aforementioned embodiment, the present invention is not limited to this. In the present invention, as in a preparative chromatograph 200 according to a first modified example shown in FIGS. 3 and 4, a pump and a cylinder for supplying carbon dioxide to a flow path (70) between a back pressure regulator 7 and a fractionator 3 may alternatively be provided separately from a pump and a cylinder for supplying carbon dioxide in a supercritical state to a flow path (40) upstream of separation columns 11. That is, a pump 61 and a cylinder 64 for supplying carbon dioxide for a make-up solvent may be provided separately from a pump 261 and a cylinder 264 for supplying carbon dioxide in a supercritical state for a mobile phase.

While the flow path switching valve 8 switches the supply destination of the liquid supplied from the pump 62 (second pump) between the flow path (40) upstream of the separation columns 11 and the flow path (70) between the back pressure regulator 7 and the fractionator 3 in the aforementioned embodiment, the present invention is not limited to this. In the present invention, as in the prepared chromatograph 200 according to the first modified example shown in FIGS. 3 and 4, a pump for supplying a liquid (solvent) as a mobile phase to the flow path (40) upstream of the separation columns 11 and liquid storages for storing the liquid (solvent) as a mobile phase may alternatively be provided separately from a pump for supplying a liquid (solvent) as a make-up solvent to the flow path (70) between the back pressure regulator 7 and the fractionator 3 and liquid storages for storing the liquid used as a make-up solvent. That is, a pump 62 for supplying a liquid (solvent) for a mobile phase and liquid storages 65 may be provided separately from a pump 262 for supplying a liquid (solvent) for a make-up solvent and liquid storages 265.

While one flow path switching valve 8 is provided in the aforementioned embodiment, the present invention is not limited to this. In the present invention, two or more flow path switching valves may alternatively be provided. For example, as in the preparative chromatograph 200 according to the first modified example shown in FIGS. 3 and 4, a flow path switching valve 281 provided on the flow path 40 side (upstream of a mixer 4) and a flow path switching valve 282 provided on the flow path 80 side (upstream of a check valve 81) may be provided. In the preparative chromatograph 200, in a supercritical fluid chromatograph mode shown in FIG. 3, an internal flow path of the flow path switching valve 281 is switched such that carbon dioxide in a supercritical state is supplied from the pump 261 to the mixer 4. Then, an internal flow path of the flow path switching valve 282 is switched such that a make-up solvent is supplied from the pump 262 to the flow path (70) between the back pressure regulator 7 and the fractionator 3 via the flow path 80. Furthermore, in the preparative chromatograph 200, in the liquid chromatograph mode shown in FIG. 4, the internal flow path of the flow path switching valve 281 is switched such that a liquid (solvent) is supplied as a mobile phase from the pump 62 to the mixer 4. Then, the internal flow path of the flow path switching valve 282 is switched such that carbon dioxide is supplied as a make-up solvent from the pump 61 to the flow path (70) between the back pressure regulator 7 and the fractionator 3 via the flow path 80.

While the flow path switching valve 8 switches the supply destination of the carbon dioxide supplied from the pump 61 (first pump) and the supply destination of the liquid (solvent) supplied from the pump 62 (second pump) in the aforementioned embodiment, the present invention is not limited to this. In the present invention, the preparative chromatograph may alternatively switch the supply destination of the carbon dioxide supplied from the first pump and the supply destination of the liquid (solvent) supplied from the second pump by opening and closing a solenoid valve provided in the flow path.

While the controller 9 controls switching of the supply destination of the carbon dioxide supplied from the pump 61 (first pump) by the flow path switching valve 8 based on the switching operation of the user in the aforementioned embodiment, the present invention is not limited to this. In the present invention, the user himself/herself may alternatively operate the flow path switching valve to switch the supply destination of the carbon dioxide supplied from the first pump. That is, the supply destination of the carbon dioxide supplied from the first pump may be manually switched. Furthermore, the controller may automatically switch the preparative mode to the liquid chromatograph mode or the supercritical fluid chromatograph mode to switch the supply destination of the carbon dioxide supplied from the first pump when the sample to be injected in the sample injection device (sample injector) is selected.

While the controller 9 controls switching of the supply destination of the liquid (solvent) supplied from the pump 62 (second pump) by the flow path switching valve 8 based on the switching operation of the user in the aforementioned embodiment, the present invention is not limited to this. In the present invention, the user himself/herself may alternatively operate the flow path switching valve to switch the supply destination of the carbon dioxide supplied from the second pump. That is, the supply destination of the liquid (solvent) supplied from the second pump may be manually switched. Furthermore, the controller may automatically switch the preparative mode to the liquid chromatograph mode or the supercritical fluid chromatograph mode to switch the supply destination of the liquid (solvent) supplied from the second pump when the sample to be injected in the sample injection device (sample injector) is selected.

Figure 5:
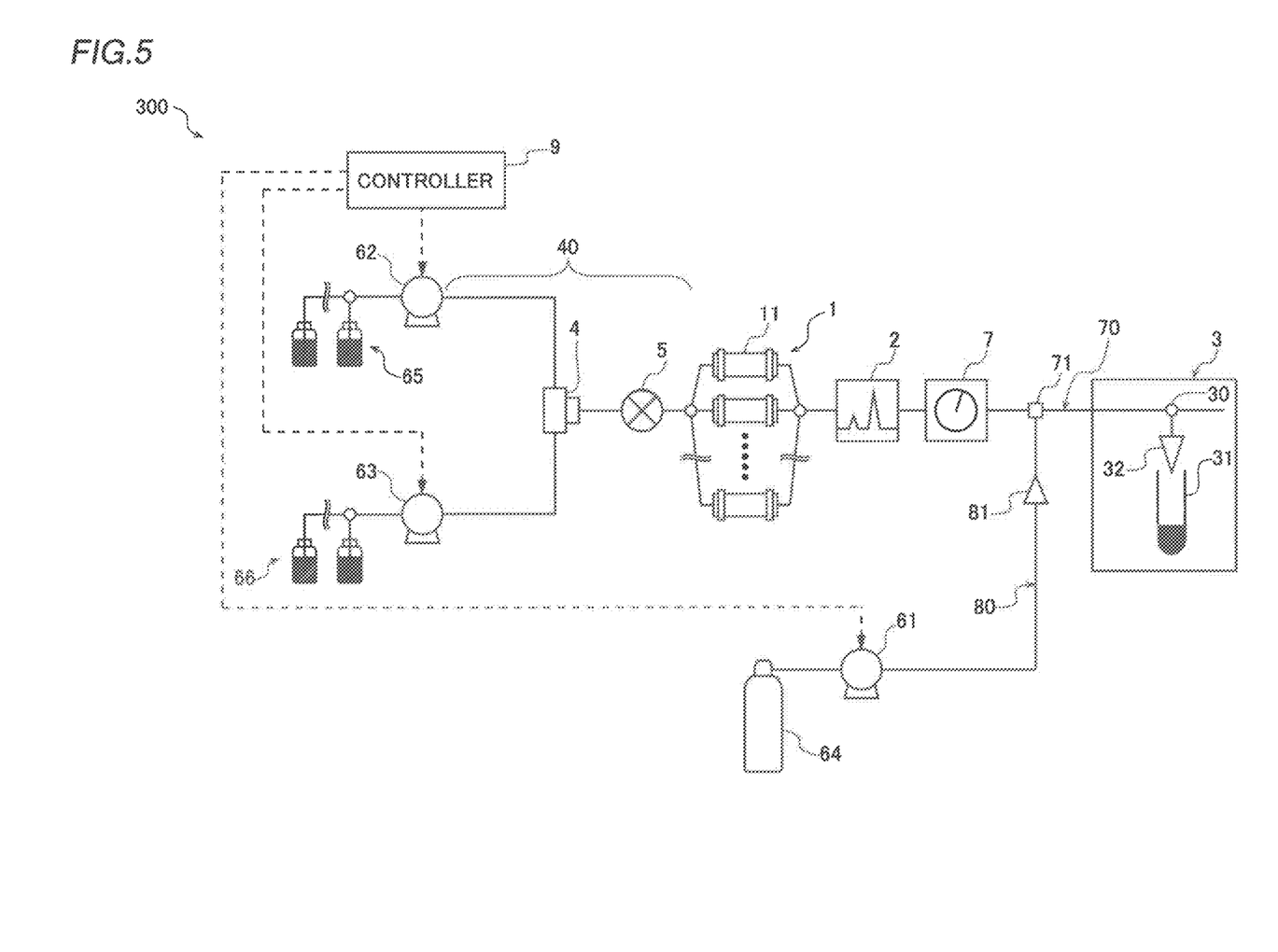
FIG. 5 is a schematic view showing the overall configuration of a preparative chromatograph according to a second modified example.

While the preparative chromatograph 100 is configured to switch between the liquid chromatograph mode and the supercritical fluid chromatograph mode in the aforementioned embodiment, the present invention is not limited to this. In the present invention, as in a preparative chromatograph 300 according to a second modified example shown in FIG. 5, only component separation using liquid chromatography may alternatively be performed. In the preparative chromatograph 300, as in the liquid chromatograph mode of the preparative chromatograph 100 according to the aforementioned embodiment, carbon dioxide is supplied as a make-up solvent from a pump 61 to a liquid (mobile phase) containing components of a sample before a fluid containing the components of the sample is separated into a gas and a liquid in a gas-liquid separator 32 (before the components of the sample separated by separation columns 11 are fractionated by a fractionator 3).

While in the liquid chromatograph mode, the carbon dioxide is supplied from the pump 61 (first pump) to the flow path (70) between the back pressure regulator 7 and the fractionator 3 in the aforementioned embodiment, the present invention is not limited to this. In the present invention, in the liquid chromatograph mode, a flow path to which carbon dioxide is supplied is only required to be between the separation columns and the gas-liquid separator. For example, in the liquid chromatograph mode, the flow path to which carbon dioxide is supplied may alternatively be any of a flow path between the separation columns and a detector, a flow path between the detector and a back pressure regulator, and a flow path between the back pressure regulator and the fractionator.

Aspects

It will be appreciated by those skilled in the art that the exemplary embodiments described above are specific examples of the following aspects.

(Item 1)

A preparative chromatograph comprising:
 a separation column configured to separate components of a sample;
 a detector provided downstream of the separation column, the detector being configured to detect the components of the sample separated by the separation column; and
 a fractionator including a gas-liquid separator configured to separate a fluid containing the components of the sample into a gas and a liquid, the fractionator being provided downstream of the detector, the fractionator being configured to fractionate the components of the sample separated by the separation column based on a detection result of the detector;
wherein
 the preparative chromatograph is configured to supply carbon dioxide to a flow path between the separation column and the fractionator.

(Item 2)

The preparative chromatograph according to item 1, configured to switch between a liquid chromatograph mode in which the sample is sent together with a liquid to the separation column and a supercritical fluid chromatograph mode in which the sample is sent together with carbon dioxide in a supercritical state to the separation column; and
 configured to supply the carbon dioxide to the flow path between the separation column and the fractionator in the liquid chromatograph mode.

(Item 3)

The preparative chromatograph according to item 2, further comprising:
 a first pump configured to supply the carbon dioxide to a flow path;
 a back pressure regulator provided between the detector provided downstream of the separation column and the gas-liquid separator, the back pressure regulator being configured to adjust a pressure in a flow path on the detector side; and
a flow path switching valve configured to switch a supply destination of the carbon dioxide supplied from the first pump between a flow path between the back pressure regulator and the fractionator and a flow path upstream of the separation column.

(Item 4)
The preparative chromatograph according to item 3, further comprising:
a second pump configured to supply a liquid to a flow path; wherein
the flow path switching valve is configured to switch a supply destination of the liquid supplied from the second pump between the flow path upstream of the separation column and the flow path between the back pressure regulator and the fractionator.

(Item 5)
The preparative chromatograph according to item 4, further comprising:
a controller configured or programmed to control driving of the first pump; wherein
the controller is configured or programmed to control switching of the supply destination of the carbon dioxide supplied from the first pump by the flow path switching valve based on a switching operation of a user.

(Item 6)
The preparative chromatograph according to item 5, wherein
the controller is configured or programmed to control the switching of the supply destination of the carbon dioxide supplied from the first pump by the flow path switching valve based on the switching operation of the user to supply the carbon dioxide supplied from the first pump to the flow path between the back pressure regulator and the fractionator in the liquid chromatograph mode and supply the carbon dioxide in the supercritical state supplied from the first pump to the flow path upstream of the separation column in the supercritical fluid chromatograph mode.

(Item 7)
The preparative chromatograph according to item 6, further comprising:
a third pump configured to supply a liquid to the flow path upstream of the separation column; wherein
the controller is configured or programmed to control switching of the supply destination of the liquid supplied from the second pump by the flow path switching valve based on a switching operation of the user to mix the liquid supplied from the second pump and the liquid supplied from the third pump in the flow path upstream of the separation column in the liquid chromatograph mode and supply the liquid supplied from the second pump to the flow path between the back pressure regulator and the fractionator in the supercritical fluid chromatograph mode.

(Item 8)
A preparative method using a preparative chromatograph, the preparative method comprising:
separating components of a sample by a separation column;
detecting the components of the sample separated by the separation column;
fractionating the components of the sample separated by the separation column based on a detection result obtained by the detecting;
separating a fluid containing the components of the sample fractionated in the fractionating into a gas and a liquid; and
supplying carbon dioxide to the fluid containing the components of the sample before the fractionating of the components of the sample separated by the separation column.

(Item 9)
The preparative method according to item 8, further comprising:
switching a supply destination of the carbon dioxide between a flow path upstream of the separation column and a flow path downstream of the separation column to switch between a liquid chromatograph mode in which the sample is sent together with a liquid to the separation column and a supercritical fluid chromatograph mode in which the sample is sent together with carbon dioxide in a supercritical state to the separation column.

What is claimed is:

1. A preparative chromatograph comprising:
a separation column configured to separate components of a sample;
a detector provided downstream of the separation column, the detector being configured to detect the components of the sample separated by the separation column; and
a fractionator including a gas-liquid separator configured to separate a fluid containing the components of the sample into a gas and a liquid, the fractionator being provided downstream of the detector, the fractionator being configured to fractionate the components of the sample separated by the separation column based on a detection result of the detector;
wherein
the preparative chromatograph is configured to supply carbon dioxide to a flow path between the separation column and the fractionator.

2. The preparative chromatograph according to claim 1, configured to switch between a liquid chromatograph mode in which the sample is sent together with a liquid to the separation column and a supercritical fluid chromatograph mode in which the sample is sent together with carbon dioxide in a supercritical state to the separation column; and
configured to supply the carbon dioxide to the flow path between the separation column and the fractionator in the liquid chromatograph mode.

3. The preparative chromatograph according to claim 2, further comprising:
a first pump configured to supply the carbon dioxide to a flow path;
a back pressure regulator provided between the detector provided downstream of the separation column and the gas-liquid separator, the back pressure regulator being configured to adjust a pressure in a flow path on the detector side; and
a flow path switching valve configured to switch a supply destination of the carbon dioxide supplied from the first pump between a flow path between the back pressure regulator and the fractionator and a flow path upstream of the separation column.

4. The preparative chromatograph according to claim 3, further comprising:
a second pump configured to supply a liquid to a flow path; wherein the flow path switching valve is configured to switch a supply destination of the liquid supplied from the second pump between the flow path upstream of the separation column and the flow path between the back pressure regulator and the fractionator.

5. The preparative chromatograph according to claim 4, further comprising:
a controller configured or programmed to control driving of the first pump; wherein
the controller is configured or programmed to control switching of the supply destination of the carbon dioxide supplied from the first pump by the flow path switching valve based on a switching operation of a user.

6. The preparative chromatograph according to claim 5, wherein
the controller is configured or programmed to control the switching of the supply destination of the carbon dioxide supplied from the first pump by the flow path switching valve based on the switching operation of the user to supply the carbon dioxide supplied from the first pump to the flow path between the back pressure regulator and the fractionator in the liquid chromatograph mode and supply the carbon dioxide in the supercritical state supplied from the first pump to the flow path upstream of the separation column in the supercritical fluid chromatograph mode.

7. The preparative chromatograph according to claim 6, further comprising:
a third pump configured to supply a liquid to the flow path upstream of the separation column; wherein
the controller is configured or programmed to control switching of the supply destination of the liquid supplied from the second pump by the flow path switching valve based on a switching operation of the user to mix the liquid supplied from the second pump and the liquid supplied from the third pump in the flow path upstream of the separation column in the liquid chromatograph mode and supply the liquid supplied from the second pump to the flow path between the back pressure regulator and the fractionator in the supercritical fluid chromatograph mode.

8. A preparative method using a preparative chromatograph, the preparative method comprising:
separating components of a sample by a separation column;
detecting the components of the sample separated by the separation column;
fractionating the components of the sample separated by the separation column based on a detection result obtained by the detecting;
separating a fluid containing the components of the sample fractionated in the fractionating into a gas and a liquid; and
supplying carbon dioxide to the fluid containing the components of the sample before the fractionating of the components of the sample separated by the separation column.

9. The preparative method according to claim 8, further comprising:
switching a supply destination of the carbon dioxide between a flow path upstream of the separation column and a flow path downstream of the separation column to switch between a liquid chromatograph mode in which the sample is sent together with a liquid to the separation column and a supercritical fluid chromatograph mode in which the sample is sent together with carbon dioxide in a supercritical state to the separation column.

* * * * *